United States Patent [19]

Gaskell et al.

[11] Patent Number: 4,620,238
[45] Date of Patent: Oct. 28, 1986

[54] METHOD AND APPARATUS FOR RECORDING AND REPLAY OF DIGITAL AUDIO DATA

[75] Inventors: Philip S. Gaskell, London, England; Roger Lagadec, Rumlang, Switzerland; Guy W. W. McNally, Shere, England

[73] Assignee: Willi Studer AG, Regensdorf, Switzerland

[21] Appl. No.: 644,194

[22] Filed: Aug. 24, 1984

[30] Foreign Application Priority Data

Aug. 26, 1983 [GB] United Kingdom ............... 8323110

[51] Int. Cl.⁴ .......................... G11B 5/00; G11B 15/46
[52] U.S. Cl. .......................................... 360/8; 360/73
[58] Field of Search ................... 360/8, 51, 73; 369/60

[56] References Cited

U.S. PATENT DOCUMENTS

| | | | |
|---|---|---|---|
| 3,320,600 | 5/1967 | Headrick et al. | 360/73 |
| 3,571,801 | 3/1971 | Coolidge et al. | 360/51 |
| 3,803,632 | 4/1974 | Irwin et al. | 360/73 |
| 3,967,316 | 6/1976 | Suyama et al. | 360/51 |
| 4,143,407 | 3/1979 | Liberty | 360/51 |
| 4,220,997 | 9/1980 | Hager | 360/73 |
| 4,382,268 | 5/1983 | Frimet | 360/73 |

FOREIGN PATENT DOCUMENTS

| | | | |
|---|---|---|---|
| 46231A1 | 2/1982 | European Pat. Off. | 360/51 |
| 2555433 | 6/1977 | Fed. Rep. of Germany | 360/51 |
| 1133879 | 11/1968 | United Kingdom | 360/51 |
| 1355648 | 7/1971 | United Kingdom | 360/51 |
| 1355649 | 7/1971 | United Kingdom | 360/51 |
| 2089094 | 6/1982 | United Kingdom | 360/51 |

OTHER PUBLICATIONS

"Variable Velocity Constant Density Magnetic Tape Recording" by F. Kost et al., IBM TDB, vol. 12, #7, 12/69.

Primary Examiner—Vincent P. Canney
Attorney, Agent, or Firm—Robert F. O'Connell

[57] ABSTRACT

For both recording and replay, a digital audio tape (14) is accelerated very rapidly by a motor servo (9), motor (8) and capstan (7) so that the tape speed overshoots nominal speed range before settling back to this range in an oscillatory manner. The digital samples are recorded and replayed via a head (15), a random access memory (16) and input/output electronics (19). During recording, the store (17) is precharged by starting to write in as soon as acceleration is initiated. Read-out to the tape is initiated as soon as the tape first reaches the nominal speed range. Uniformity of samples as recorded on the tape is preserved by clocking a read address generator (21) at a rate proportional to tape speed, signaled by a tachometer (7). The write address generator is clocked at the constant sampling rate. For replay the write address generator is clocked at the tape speed rate while the read address generator (21) is clocked at the constant sample rate. Write in and read out are both initiated when the tape speed first reaches the nominal range. The addresses provided by the generators (20 and 21) are compared by a comparator (22) which provides a reference signal to the servo (9) in an arrangement such as to adjust the tape speed always in the sense to maintain a constant degree of filling of the store (17).

20 Claims, 6 Drawing Figures

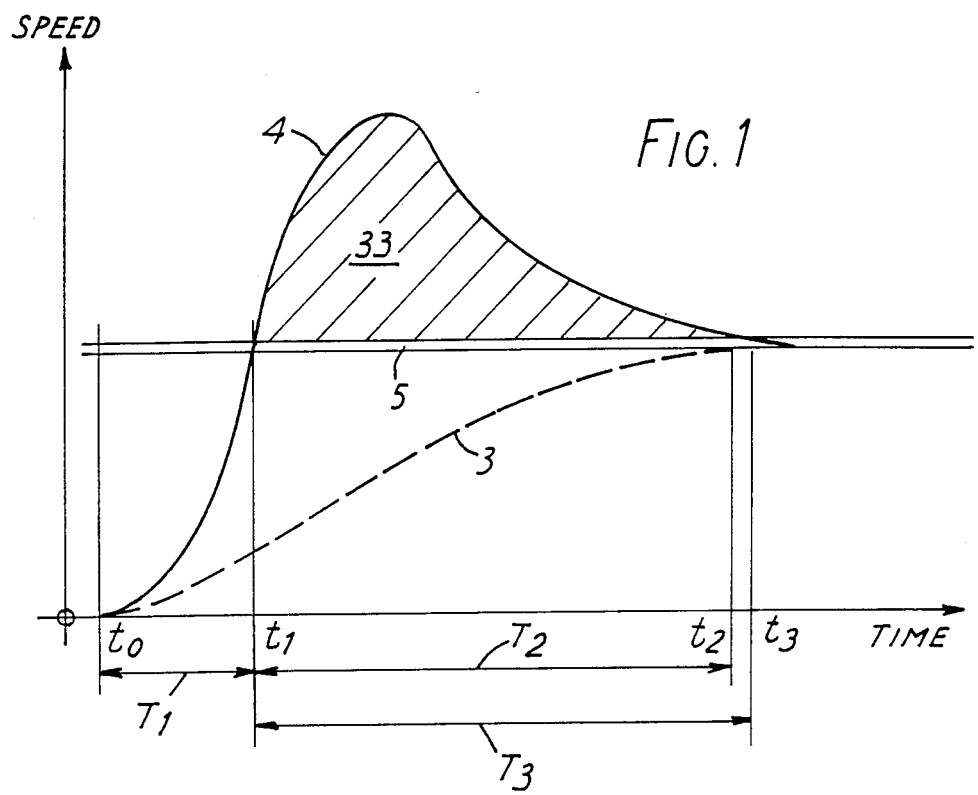
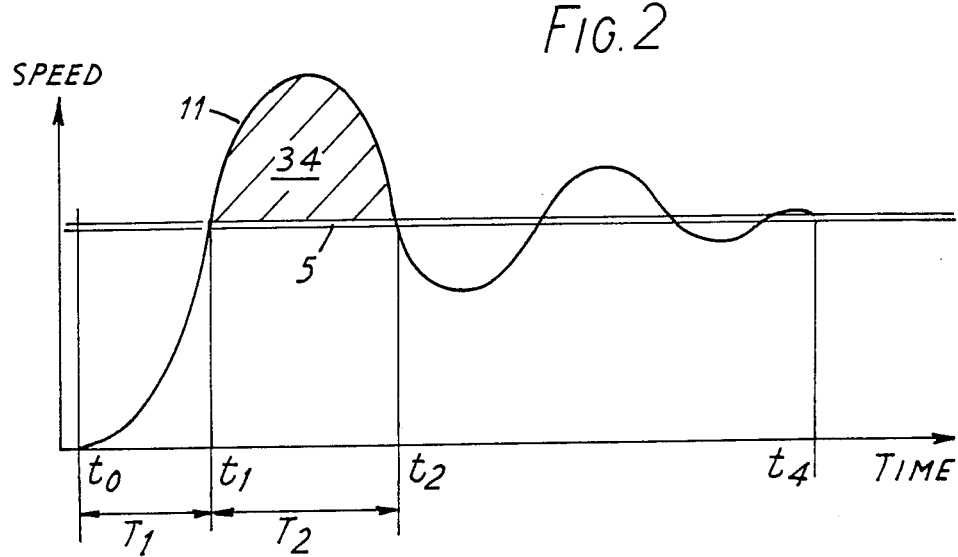

METHOD AND APPARATUS FOR RECORDING AND REPLAY OF DIGITAL AUDIO DATA

FIELD OF USE

This invention relates to a method for recording and replay of digital audio data on magnetic tape and to apparatus for carrying out this method.

PRIOR ART

The quality of recording and replay with digital audio is very sensitive to variations in tape speed. Since the speed is inevitably not absolutely constant, we define the nominal speed of the tape as that means speed for which the accumulated speed variations over the time of operation of the tape equal zero. In the present state of the art, these speed variations are compensated for by time base correction, which uses a very small buffer memory, only capable of storing and subsequently releasing data in order to transform the not absolutely regular data output from the tape to an absolutely regular one. In practice the tape runs within a nominal speed range about the exact nominal speed and the small residual fluctuations of the speed are confined to that speed range.

In a conventional start-up operation, the tape is accelerated from zero speed to its nominal speed range in a certain and finite time. Until the tape stabilises to its nominal speed range, correct recording and replay of the samples representing the digital audio data is not possible. This is because the velocity of the tape is varying and does not always correspond to the actual sampling rate. The condition for accurate recording is to have a uniform distribution of samples on the tape. For replay, the condition is that the samples have to reach the audio electronics at a rate corresponding to the nominal speed range. Since these conditions are not met during start-up operations, the correct recording or replay only starts when tape has stabilised to its nominal velocity range.

Synchronising two digital recorders with great accuracy using the conventional techniques of analogue recorders is slow and locking to common clocks brings an additional uncertainty. Synchronising two analogue audio tape machines is in practice achieved by adjusting the tape-speed of a second tape machine to the tape speed of a first tape machine. As the tape speed is not perfectly constant, this means that the tape speed of the second tape machine follows the tape speed of the first tape machine, but with alternately positive and negative differences.

The synchronisation of two digital tape machines is different in that the tape speed of both tape machines is to be synchronised to a common time reference. There may then remain a certain phase-difference between the two tapes. This may mean that corresponding digital audio samples are not recorded or replayed at the same time. At present the techniques for synchronising digital audio on magentic tape are not satisfactory and perfect synchronisation is not possible.

PROBLEM

The object of the present invention is therefore to provide a method for recording and replay of digital audio data on magnetic tape which permits fast start-up and synchronisation, together with apparatus for performing this method.

THE INVENTION

The present invention firstly provides a method of effecting fast start-up of a recording or replay operation of digital information on a magnetic tape having a nominal tape speed range, characterised in that the recording and playback and effected through a digital store, the tape is accelerated rapidly so as to overshoot the nominal tape speed range before stabilizing in that range, and recording on to the tape from thedigital store or replay from the tape into the digital store is initiated substantially before the speed has stabilized in the said range.

OPERATION

The invention additionally provides apparatus for carrying out this method, comprising a tape machine, a store connected between record and replay head(s) of the machine and input/output electroncis for the digital information, means for starting the machine in such a way that the tape is accelerated so rapidly as to overshoot the nominal tape speed range, and a control unit for initiating the recording on to the tape from the digital store or the replay from the tape into the digital Using the invented mthod, a much faster start-up is possible. This means that correct recording and reply of digital audio data is reached in a much shorter time after starting the tape machine. the method also allows fast synchronisation between two or more tape machines. In addition this synchronisation is very simple to obtain and failure of synchronism is most improbable. As this invented method operates with a store, the usual Time Base Correction circuitry may be omitted by incorporating its functions into that of the store.

BRIEF DESCRIPTION OF DRAWINGS

The invention will be described in more detail, by way of example, with reference to the accompanying drawings, in which:

FIGS. 1 and 2 show variations of tape speed during start-up,

DESCRIPTION OF PREFERRED EMBODIMENT

In FIG. 1, the vertical axis of the diagram represents the speed of a tape driven in a well known manner. The horizontal axis represents time. Conventionally, the speed of a tape during start-up operations commencing at time $t_o$ has a profile similar to the dotted line 3. During a start-up operation making use of the invented method, the speed may have a profile similar to line 4. In both cases, the speed has ultimately to reach a nominal speed range 5. Whereas with conventional techniques, correct recording or replay can only begin when the tape speed stabilises to the nominal range 5 at time $t_2$, the invented method allows correct recording or replay to begin as soon as the tape approaches the nominal speed at time $t_1$. Therefore, it is advantageous with the invented method that a speed profile similar to 4 be followed since the nominal speed range 5 is first reached after a time $T_1$: it takes an additional time $T_3$ to stabilize to the nominal speed range 5. In conventional operation, it takes the tape a time $T_2$ added to the time $T_1$ to reach the nominal speed range 5.

FIG. 2 shows a diagram similiar to FIG. 1, but here the speed 11 of the tape approaches the nominal speed range 5a in the manner of a damped oscillation.

Figure 3:
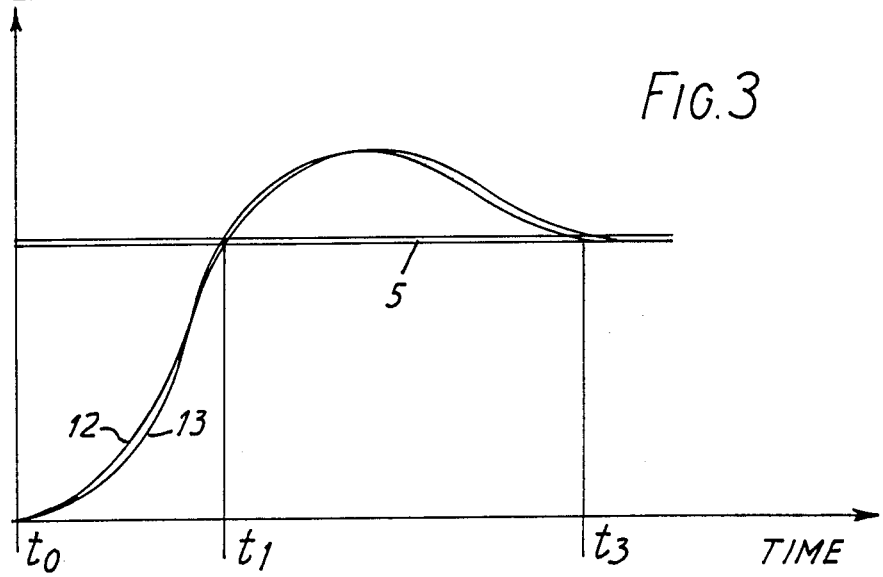
FIG. 3 shows variations of tape speed of two tape machines to be synchronised.
Figure 4:
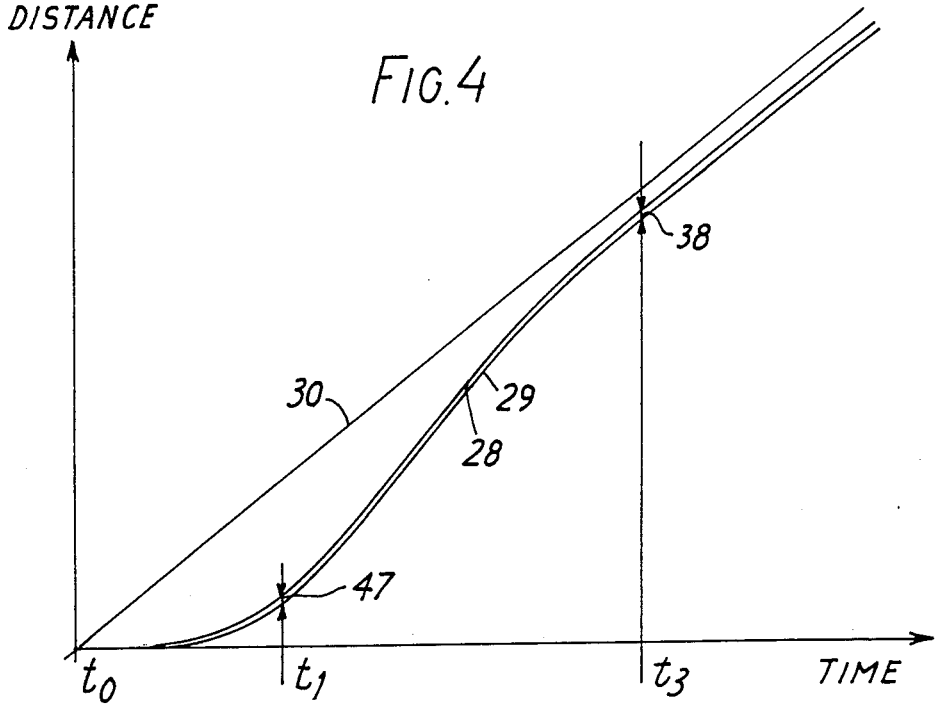
FIG. 4 shows distances covered by two synchronised tapes after different times.

In a similar diagram, FIG. 3 shows two slightly different speed profiles 12 and 13 of two similar tape machines accelerating their respective tapes from zero to a common nominal speed range 5. In FIG. 4, distances covered by a specific tape-element after accelerating according to the speed profiles of FIG. 3 are shown. Curves 28 and 29 indicate distances covered by the two separate tapes on two tape machines. Line 30 indicates the distance covered by a third tape with theoretical immediate acceleration up to nominal speed.

Figure 5:
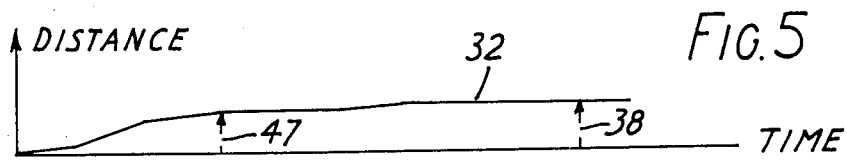
FIG. 5 shows the difference of the distances according to FIG. 4.

In FIG. 5, the curve 32 shows the difference between the distances covered by the two tapes and it is apparent that the difference stabilizes when acceleration of the tapes has ended.

Figure 6:
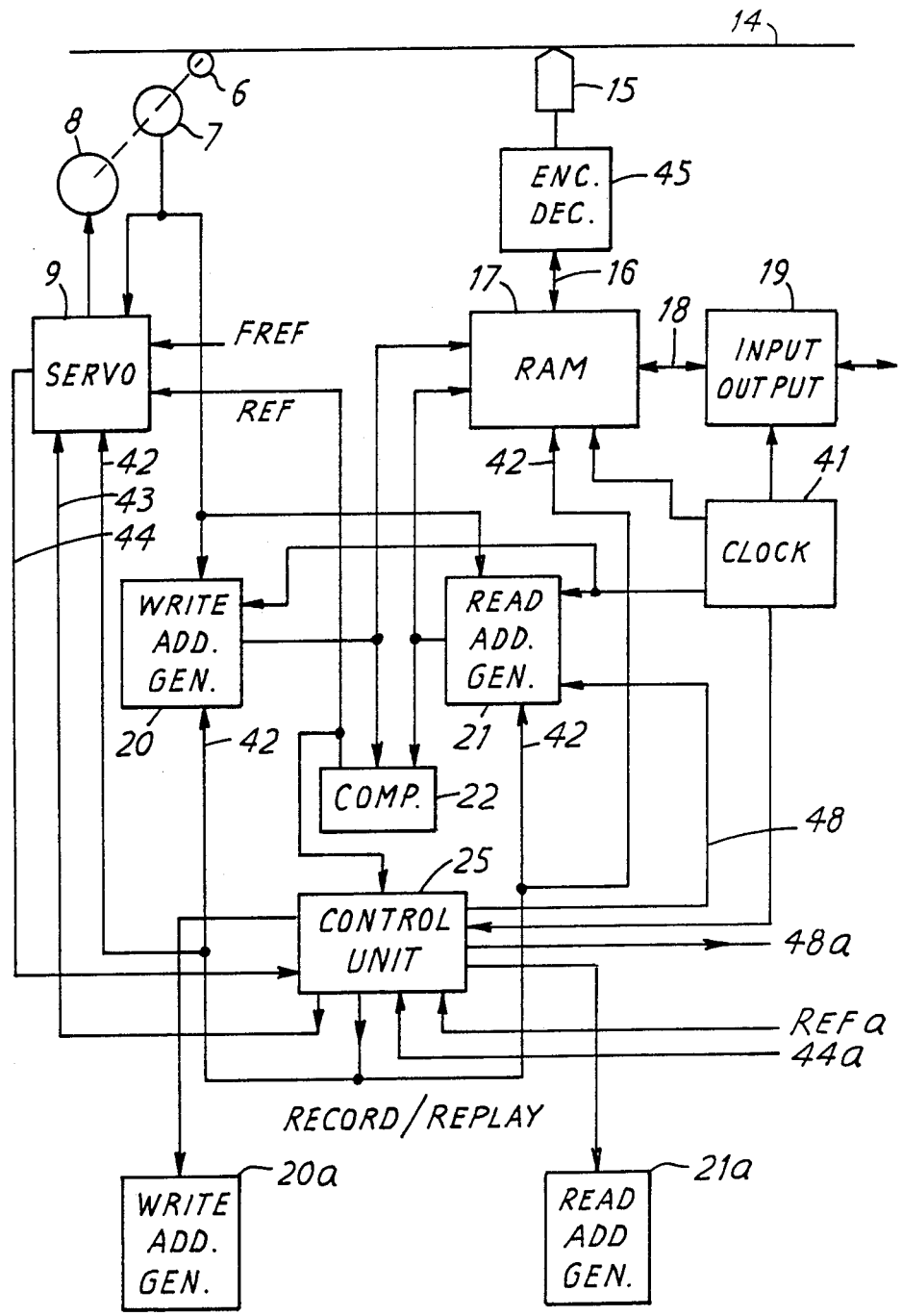
FIG. 6 is a block diagram of the apparatus embodying the invention.

FIG. 6 is a block diagram of an apparatus for recording on and for replay from magnetic tape 14. This apparatus comprises a tape machine well known and belonging to the state of the art. The machine is represented by a record and replay head 15, a capstan 6, a tachometer 7, a motor 8 and a servo 9 for controlling the motor 8. In practice there will almost certainly be separate replay and recording heads but a combined head is shown for simplicity of description of both recording and replay operations. The head 15 is connected by a line 16 to a RAM store 17 via an encoder/decoder unit 45. In recording, this unit works as an encoder and translates the incoming data into a format suitable for recording. In replay it performs the inverse operation as a decoder. The store 17 can be implemented using solid state RAMs with a fixed timing locked to the desired sampling frequency and several read and write cycles per sampling interval to accommodate fluctuations in the incoming data rate, as well as several read cycles for ease of processing. The necessary circuits are well known in state of the art digital audio. The store 17 is connected by means of one or more lines 18 to the usual input-output electronics 19.

All operations are synchronised by a master clock 41 which establishes the sampling interval in the input-output electronics 19 and the read-write cycle of the store 17.

The store 17 is provided with a write address generator 20 and a read address generator 21. Each of these generators can be clocked in well known manner to step cyclically through the addresses of the store 17 and each has provision to select between clocking by the clock 41 and the tachometer 7. This selection is made by a control unit 25 which, among other things, selects between record and replay modes.

The read addresses follow the write addresses and the offset between the read and write addresses represents the degree to which the store 17 is filled. A comparator 22 determines the said offset and provides a reference signal REF to the motor servo 9 which also has available a fixed reference FREF corresponding to the nominal tape speed.

The operation of the apparatus when stable running has been achieved will firstly be considered. During recording the write address generator 20 is clocked by the clock 41 at the sample rate, whereas the read address generator 21 is clocked by the tachometer 7 so that the samples are fed to the recording head 15 at a rate proportional to tape speed and are recorded at constant pitch (spacing), notwithstanding fluctuations in tape speed. The lines 16 and 18 are switched to the output and input buses of the store 17 respectively. Conversely, during replay, the lines 16 and 18 are switched to the input and output buses, the write address generator 20 is clocked by the tachometer 7 and the read address generator 21 is clocked by the clock 41. The switching of these various functions is controlled by a RECORD/REPLAY mode line 42 from the control unit 25.

The motor servo 9 compares the tachometer signal with the REF signal from the comparator 22 and adjusts the instantaneous tape speed so as to maintain a certain degree of fill of the store 17. The servo 9 has to respond oppositely to errors in the two modes and is therefore also switched by the RECORD/REPLY line 42. During recording, if the store 17 gets over-full, the tape 14 is speeded up. During replay, if the store 17 gets overfull, the tape 14 is slowed down. During replay, precise timing of the write address generator 20 may be controlled by a clock signal also replayed from the tape 14. Such a signal can be used instead of the tachometer signal.

During start-up conditions, the control unit 25 provides a signal on line 43 to the motor servo 9 to cause it to drive the tape up to speed in accordance with curve 4 of FIG. 1 or curve 11 of FIG. 2. This may be achieved in various ways, such as by use of a predetermined forcing function or by switching from use of REF to FREF and allowing the servo to act with very little damping.

Accordingly, for a fast start-up, the tape drive is started and the speed of the tape is increased as rapidly as possible, consistent with accurate replay of data from the tape. For recording, the data samples are transferred from the input/output electronics 19 through line 18 into the store 17. Accordingly the store 17 is filling-up with data from the input/output electronics 19 at the constant rate. When the tape speed approaches its nominal speed range 5, that is approximately at time $t_1$, the tape speed motor servo 9 emits a signal on line 44 to the control unit 25 which, in turn, starts the read address generator 21. This provides addresses starting with the memory location which contains the first digital audio sample to be output from the store 17. These output signals leave the store 17 at a rate corresponding to the current tape speed and are directed through line 16 to the recording head 15. Since the tape speed continues to vary after time $t_1$, the output data rate is varied to conform to the tape speed in the manner already described.

As the tape speed reaches higher values than the nominal speed range 5, the store 17 depletes more quickly than it receives new data. This situation remains during time $T_2$, which means that the store 17 has to be precharged with data samples corresponding to the area 33 in FIG. 1 or area 34 in FIG. 2 contained between $t_1$ and $t_2$. This data is loaded into the store for a period before time $t_1$ and the store should be large enough to accommodate it. Once the tape speed has stabilised to the nominal speed range 5, that is after time $t_3$ (FIG. 1) or time $t_4$ (FIG. 2), the tape speed is controlled by the comparator 22 and the motor servo 9, as described above. They ensure that, on average, the difference between the read and write addresses remains constant and hence that the average recording rate corresponds exactly to the audio data rate.

As described, the switching of the read address generator 21 at $t_1$, i.e. the initiation of the actual recording on tape, takes place in dependence upon monitored tape speed. It may also be possible to effect the switching a fixed time $T_1$ after $t_o$. This time may even be shortened to start actual recording a little before $t_1$. Similarly the switching of the servo 9 from start-up mode to normal mode at $t_3$ or $t_4$ may be effected after elapse of a preset time or it may be effected when the tape speed signal from the tachometer 7 or from a clock track on the tape ceases to fluctuate beyond the range 5. This may be tested by measuring the tape speed fluctuations and checking if these lie within tolerance.

For replay, data contained on the tape 14 are transferred from the replay head 15 through the line 16 to the store 17. When the tape speed first approaches the nominal range 5, i.e. around $t_1$, the servo 9 signals the control unit 25 to instruct the write address generator 20 to start writing data into the store. Since the tape speed is varying, the rate at which data is written is varied to conform to the tape speed, as described above. Also at time $t_1$ or shortly thereafter, the read address generator 21 is told by the unit 25 to start providing addresses to the memory locations which contain samples to be output from the store 17. These are directed through line 18 to the input/output electronics 19. This apparatus operates therefore in a similar way for recording and for replay. As before, once the tape speed has stabilised to its nominal value, it is controlled by the comparator 22 and servo 9.

Fast synchronisation of two digital tape machines can be achieved by employing the fast start up techniques just described. We assume as an example that both tapes on the tape machines reach their nominal speed range 5 as shown in FIG. 3. If we look at two corresponding samples, one on each tape, before start-up at $t_o$ and we follow them through the acceleration of the tapes represented by the lines 28 and 29 we find them again at a distance 47 at time $t_1$ and a similar distance 38 at time $t_3$. If both stores 17 of both tape machines have now stored data from the times that the nominal tape speed is reached, the store 17 of the machine with the greater acceleration will be more full than the store of the other machine. This difference of data has to be corrected in order to synchronise the corresponding audio data streams.

Each tape machine to be synchronised contains essentially the apparatus shown in FIG. 6. When both machines first reach approximately nominal speed, it is then possible with the invented method immediately to synchronise the two machines. At this point, data from the tape is being written into the store 17 of each machine and regular output data may be read from each store as described earlier for the replay mode. However, since the two tapes will have accelerated in slightly different fashions, one store will be fuller than the other and originally time-synchronous samples will be at different memory locations. To synchronise the two machines, therefore, the excess data in the store of the leading machine is delayed at time $t_1$ by a number of samples corresponding to the difference 47 of the corresponding positions of the two tapes. This may be done by telling the read address generator 21 of the faster machine to jump to a new address, leaving out the excess data. The same result may be achieved, but with some delay, by freezing the write address generator 20 for the number of write cycles corresponding to the excess data.

During the subsequent period $t_1$ to $t_3$ where the tape speeds of both machines continue to vary before stabilising to the nominal speed, the operation of each machine is as described earlier for fast start-up. Synchronism of the output data of the two machines is guaranteed since they are both locked to the common clock 41.

In order to perform these operations, there has to be some common control over the two machines. A single control unit 25 may be provided for the two machines or a control unit of a master machine may send jump instructions to the control unit of a slave machine. By way of illustration, FIG. 6 illustrates the former alternative with the unit 25 connected to address generators 20a and 21a of the second machine. There will also be connections to the motor servo and store.

One specific technique for implementing the synchronisation is as follows. The control unit 25 starts the two machines in the manner described. Synchronisation is effected either a fixed time ($T_1$ in FIG. 1) after $t_o$ or when the second of the up-to speed signals on lines 44 and 44a is received. The control unit 25 then compares the states of fill of the two stores, which can be done by comparing the corresponding signals REF and $REF^a$. Then a burst of pulses is emitted on a line 48 or 48a to jump on the address generator 21 or 21a pertaining to the faster machine, the number of pulse corresponding to the excess data in the store of the faster machine. Thereafter the two machines complete the start up routines as already described and then carry on with normal replay.

Fast synchronisation may equally well be performed during recording. In this case it is the slower machine which will have excess data to be eliminated. This is again preferably effected by jumping the read address generator of this machine.

It is always necessary to control one address generator of a machine in accordance with tape speed. As already indicated the information required for this may be fed back from the tape drive (tachometer 7) or be taken from an auxiliary time track played back from the tape.

ADVANTAGEOUS EFFECT

It is clear from the above description that a faster start up is possible both in recording and in playback and that it is also possible to achieve perfect synchronisation of two digital tape machines in a rapid manner.

What is claimed is:

1. A method of effecting fast start-up of a recording or replay operation of digital information on a magnetic tape having a nominal tape speed range, characterised in that recording and play-back are effected through a digital store the tape is accelerated rapidly so as to appreciably overshoot the nominal tape speed range before stabilizing in that range, and recording on to the tape from the digital store or replay from the tape into the digital store is initiated substantially before the speed has stabilized in the said range.

2. A method according to claim 1, wherein the rate at which digital information is transferred between the tape and the store is controlled in dependence upon tape speed.

3. A method according to claim 2, wherein the store is a random access memory with a cyclicread address generator and a cyclic write address generator, one address generator is clocked at a fixed rate and the other is clocked at a rate corresponding to tape speed.

4. A method according to claim 3, wherein the read and write addresses are compared to determine the degree of fill of thestore and, once the tape speed has stabilized, the tape speed is controlled in dependence upon the degree of fill so as to tend to maintain the degree of fill constant.

5. A method according to claim 1, wherein the recording on to the tape from the digital store or the replay from the tape into the digital store is initiated substantially at the time when the tape speed first reaches the nominal speed range.

6. A method according to claim 1, wherein during recording, writing of the digital information into the store at a constant rate is initiated when acceleration of the tape is commenced and read out from the store to the tape is initiated substantially at the time when the tape speed first reaches the nominal speed range.

7. A method according to claim 1, wherein during replay, writing of the digital information into the store from the tape and read out from the store at a constant rate are both initiated substantially at the time when the tape speed first reaches the nominal speed range.

8. A method according to claim 1, wherein two tape machines with respective digital stores are simultaneously started up and synchronized by eliminating excess data from whichever store has filled more than the other during the fast start-up.

9. A method according to claim 8, wherein the synchronization by elimination of excess data is effected substantially when the slower machine first reaches the nominal tape speed range.

10. A method according to claim 3 wherein with respective digital stores two tape machines are simultaneously started up and synchronized by eliminating excess data from whichever store has filled more than the other during the fast start-up, and wherein the elimination of excess data is effected by jumping the read address generator.

11. Apparatus for carrying out the method according to claim 1, comprising a tape machine, a store connected between record and replay head(s) of the machine and input/output electronics for the digital information, means for starting the machine in such a way that the tape is accelerated so rapidly as to appreciably overshoot the nominal tape speed range, and a control unit for initiating the recording on to the tape from the digital store or the replay from the tape into the digital store substantially at the time when the tape speed first reaches the nominal speed range.

12. Apparatus according to claim 11, wherein the store is a random access memory with a cyclic read address generator and a cyclic write address generator, and the control unit has a record mode in which the write address generator is clocked at a fixed rate while the read address generator is clocked in dependence upon a signal representing tape speed, and a replay mode in which the read address generator is clocked at a fixed rate while the write address generator is clocked in dependence upon the signal representing tape speed.

13. Apparatus according to claim 12, comprising means for comparing the address provided by the two address generators and means for controlling the tape speed so as to tend to maintain the degree of fill of the store substantially constant.

14. Apparatus according to claim 12, wherein two tape machines have a common control unit or linked control units adapted to jump the read address generator of one machine so as to bring the machines into synchronisation.

15. A method of effecting fast start-up of a recording or replay operation of digital information on a magnetic tape having a nominal speed range, comprising the steps of
providing a store for said digital information;
reading in and storing said digital information to be recorded or played back in the store;
accelerating the tape sufficiently for temporarily reaching a speed value appreciably superior to the nominal speed range independently of the state of fill of the store and independently of digital information input/output; and
starting to read out digital data from the store at a time before the tape speed has stabilized at said nominal speed range.

16. A method according to claim 15, further comprising the step of:
controlling the tape speed as a function of the state of fill of the store, after the tape speed has stabilized at said nominal speed range.

17. A method according to claim 15, further comprising the step of
precharging the store with said digital data before the tape speed reaches said nominal speed range for the first time.

18. Apparatus for effecting fast start-up of a recording or replay operation of digital information on a magnetic tape having a nominal speed range, comprising
a tape machine with record and replay head(s) and input/output electronics for said digital information;
a store connected between said recording and replay heads and said input/output electronics of the tape machine;
means for controlling the tape speed during said start-up operations independently from digital information input or output; and
means for controlling the recording or replay of digital information into or from said store during said start-up operations according to the actual tape speed.

19. Apparatus according to claim 18, wherein said means for controlling the recording or replay of digital information into or from the store comprise
a clock providing clock signals related to a sampling rate of said digital information;
a tacho generator connected to said magnetic tape;
a write address generator connected to said tacho generator, to said clock and to said store; and
a read address generator connected to said tacho generator, to said clock and to said store.

20. Apparatus according to claim 18, wherein said tape machine comprises a motor and wherein said means for controlling the tape speed comprise
a tacho generator connected to said magnetic tape and to said motor;
a motor servo connected to both said tacho generator and said motor; and
a control unit connected to said motor servo.

* * * * *

UNITED STATES PATENT AND TRADEMARK OFFICE
CERTIFICATE OF CORRECTION

PATENT NO. : 4,620,238

DATED : 10/28/86

INVENTOR(S) : Philip Stuart Gaskell, Roger Lagadec and Guy William Whitsey McNally It is certified that error appears in the above—identified patent and that said Letters Patent is hereby corrected as shown below:

Column 6, line 51, after "store" add a comma (,).

Column 7, line 29, after "3" add a comma (,);
        line 29, after "wherein" add --two tape machines--.
        line 30, after "stores" delete [two tape machines].

Signed and Sealed this

Twenty-fourth Day of January, 1989

Attest:

DONALD J. QUIGG

*Attesting Officer*      *Commissioner of Patents and Trademarks*